(12) United States Patent
Koo et al.

(10) Patent No.: US 11,124,034 B2
(45) Date of Patent: Sep. 21, 2021

(54) HEIGHT ADJUSTMENT MODULE AND ROBOT SYSTEM INCLUDING THE SAME

(71) Applicants: Hyundai Motor Company, Seoul (KR); Kia Motors Corporation, Seoul (KR)

(72) Inventors: Dong Han Koo, Seoul (KR); Byeong Cheol Lee, Busan (KR); Seok Won Lee, Chungcheongnam-do (KR); Ji A Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 16/571,392

(22) Filed: Sep. 16, 2019

(65) Prior Publication Data

US 2020/0317016 A1    Oct. 8, 2020

(30) Foreign Application Priority Data

Apr. 4, 2019   (KR) .................. 10-2019-0039682

(51) Int. Cl.
  *B60G 17/00*   (2006.01)
  *B60G 7/00*    (2006.01)
  *G05D 1/02*    (2020.01)
  *B62D 5/04*    (2006.01)

(52) U.S. Cl.
  CPC ............ *B60G 17/00* (2013.01); *B60G 7/001* (2013.01); *B60G 2500/30* (2013.01); *B62D 5/04* (2013.01); *G05D 1/021* (2013.01)

(58) Field of Classification Search
  CPC .... B60G 7/001; B60G 17/00; B60G 2500/30; B60G 2300/022; B60G 2300/24; B62D 5/04; B25J 5/007; B60K 7/00; B60K 7/0007
  See application file for complete search history.

(56) References Cited

U.S. PATENT DOCUMENTS 4,663,925 A * 5/1987 Terada ................... A01D 46/24
                                                   382/153
4,750,579 A * 6/1988 Jarl .................... B60G 17/0272
                                                   180/209

(Continued)

FOREIGN PATENT DOCUMENTS

KR    10-2018-0083398 A    7/2018

*Primary Examiner* — Frank B Vanaman
(74) *Attorney, Agent, or Firm* — Mintz Levin Cohn Ferris Glovsky and Popeo, P.C.; Peter F. Corless

(57) ABSTRACT

A height adjustment module includes a mounting part extending on a plane; a plurality of support arms disposed around the mounting part on the plane on which the mounting part has been extended, and coupled to the mounting part to be rotatable upward or downward; a plurality of travelling parts each being coupled to a first end portion of the support arm, respectively, and including a wheel contacting the ground, respectively; a lift extending over the plane, and connected to second end portions of the plurality of support arms so that vertical movement is interlocked with each other; and a support link coupled to the mounting part to be vertically slidable, and coupled to the lift to be vertically fixed to move the mounting part relative to the lift as the support link is slid in the mounting part.

11 Claims, 6 Drawing Sheets

(56) References Cited

U.S. PATENT DOCUMENTS

| | | | | |
|---|---|---|---|---|
| 5,535,843 | A * | 7/1996 | Takeda | B25J 5/007 |
| | | | | 180/200 |
| 5,772,237 | A * | 6/1998 | Finch | A61G 5/06 |
| | | | | 180/65.1 |
| 6,491,127 | B1 * | 12/2002 | Holmberg | B60K 7/0007 |
| | | | | 180/21 |
| 9,259,634 | B1 * | 2/2016 | Bouse | A63B 69/0071 |
| 2006/0097683 | A1 * | 5/2006 | Hosoda | B62D 57/024 |
| | | | | 318/568.12 |
| 2011/0127745 | A1 * | 6/2011 | Song | B60G 3/145 |
| | | | | 280/124.144 |
| 2012/0111648 | A1 * | 5/2012 | Terashima | B60K 7/0007 |
| | | | | 180/6.2 |
| 2019/0200519 | A1 * | 7/2019 | Chrysanthakopoulos | |
| | | | | A01M 21/04 |

* cited by examiner

HEIGHT ADJUSTMENT MODULE AND ROBOT SYSTEM INCLUDING THE SAME

CROSS REFERENCE TO RELATED APPLICATION

The present application claims under 35 U.S.C. § 119(a) the benefit of Korean Patent Application No. 10-2019-0039682 filed on Apr. 4, 2019, the entire contents of which are incorporated by reference herein.

BACKGROUND

(a) Technical Field

The present disclosure relates to a height adjustment module and a robot system including the same, more particularly, to the height adjustment module and robot system for varying a height by collecting or unfolding a wheel contacting the ground at a mounting part side.

(b) Description of the Related Art

A humanoid robot is a robot that may have similarities to the human body, and in particular, can replace the role of a human. For example, service robots have been utilized in large shopping malls, airports, retail stores, etc. that require interaction and/or communication with humans.

These robots typically include a display where, such displays are generally of a touch input type. Therefore, the touch input type display for transferring information with humans should be disposed at a height similar to that of humans, such that the robot requires a considerable height.

However, there is a problem in that these robots work by being disposed in a complex and narrow space while coexisting with humans, and it is difficult to secure a large area supported in contact with the ground.

Therefore, conventional robots have a problem of insufficient stability, and therefore, there has been a problem in that there is a danger that the robots would be turned over or knocked down, thereby making it impossible to travel at a high speed.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a module and a robot system including the same, which can simultaneously adjust a height from the ground and a contact area of the ground through one actuator so that the stability and height of the robot are secured according to the situation.

A height adjustment module according to the present disclosure for achieving the object includes: a mounting part extending on a plane; a plurality of support arms disposed around the mounting part on the plane on which the mounting part has been extended, and coupled to the mounting part to be rotatable upward or downward; a plurality of travelling parts being coupled to a first end portion of the support arm, respectively, and including a wheel contacting the ground, respectively; a lift extending on the plane, and connected to second end portions of the plurality of support arms so that vertical movement is interlocked with each other; and a support link coupled to the mounting part to be vertically slidable, and coupled to the lift to be vertically fixed to move the mounting part relative to the lift as the support link is slid in the mounting part.

The mounting part can include an upper plate part and a lower plate part vertically spaced apart from each other, and a connecting part for connecting the upper plate part and the lower plate part to each other, and the lift can be vertically moved between the upper plate part and the lower plate part.

A through hole vertically penetrated can be formed in the upper plate part, and a guide link extending upward from the upper plate part while penetrating the through hole can be formed in the lift, such that a distance between an upper end portion of the guide link and the mounting part can be varied according to the relative movement between the lift and the mounting part.

The support arm can include a first link and a second link vertically spaced apart from each other in parallel, and the first link and the second link can be coupled to the mounting part and the travelling part at a position vertically spaced apart from each other.

The first link can have the second end portion extended to the lift side to be coupled to the mounting part between the first end portion thereof and the second end portion thereof, and the connecting link can be coupled to the second end portion of the first link and the lift at both ends thereof to be rotatable upward or downward, respectively, to connect the first link and the lift.

The height adjustment module can further include an actuator prepared in the mounting part to vertically slide the support link in the mounting part.

Each of the travelling parts can include a driving motor for providing a driving force to rotate the wheel.

The wheel in the travelling part can be rotatably coupled to the travelling part with respect to the rotary shaft perpendicular to the ground, and each of the travelling parts can include a steering motor for rotating the wheel with respect to the rotary shaft perpendicular to the ground.

A distance between the plurality of travelling parts can be reduced when the plurality of support arms are rotated downward with respect to the mounting part, and the distance between the plurality of travelling parts can be extended when the plurality of support arms are rotated upward with respect to the mounting part.

A robot system including the height adjustment module according to the present disclosure for achieving the object can have the main body of a robot coupled to the upper end portion of the guide link at the upper portion of the guide link.

The robot system including the height adjustment module can further include a control unit for controlling an actuator to vertically slide the support link in the mounting part based on the required height of the robot.

The wheel in the travelling part can be rotatably coupled to the travelling part with respect to the rotary shaft perpendicular to the ground, and each of the travelling parts can include a driving motor for providing a driving force to rotate the wheel and a steering motor for rotating the wheel with respect to the rotary shaft perpendicular to the ground, and the control unit can control the driving motor and the steering motor based on the required movement of the robot.

According to the height adjustment module of the present disclosure, it is possible to adjust the height by simultaneously rotating the plurality of support arms according to the movement of the lift.

In addition, it is possible to vary the area supported to the ground together with the height by the rotation of the support arm, thereby securing stability.

In addition, it is possible to increase the adjusted height by mounting the main body of the robot on the upper portion of the guide link.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
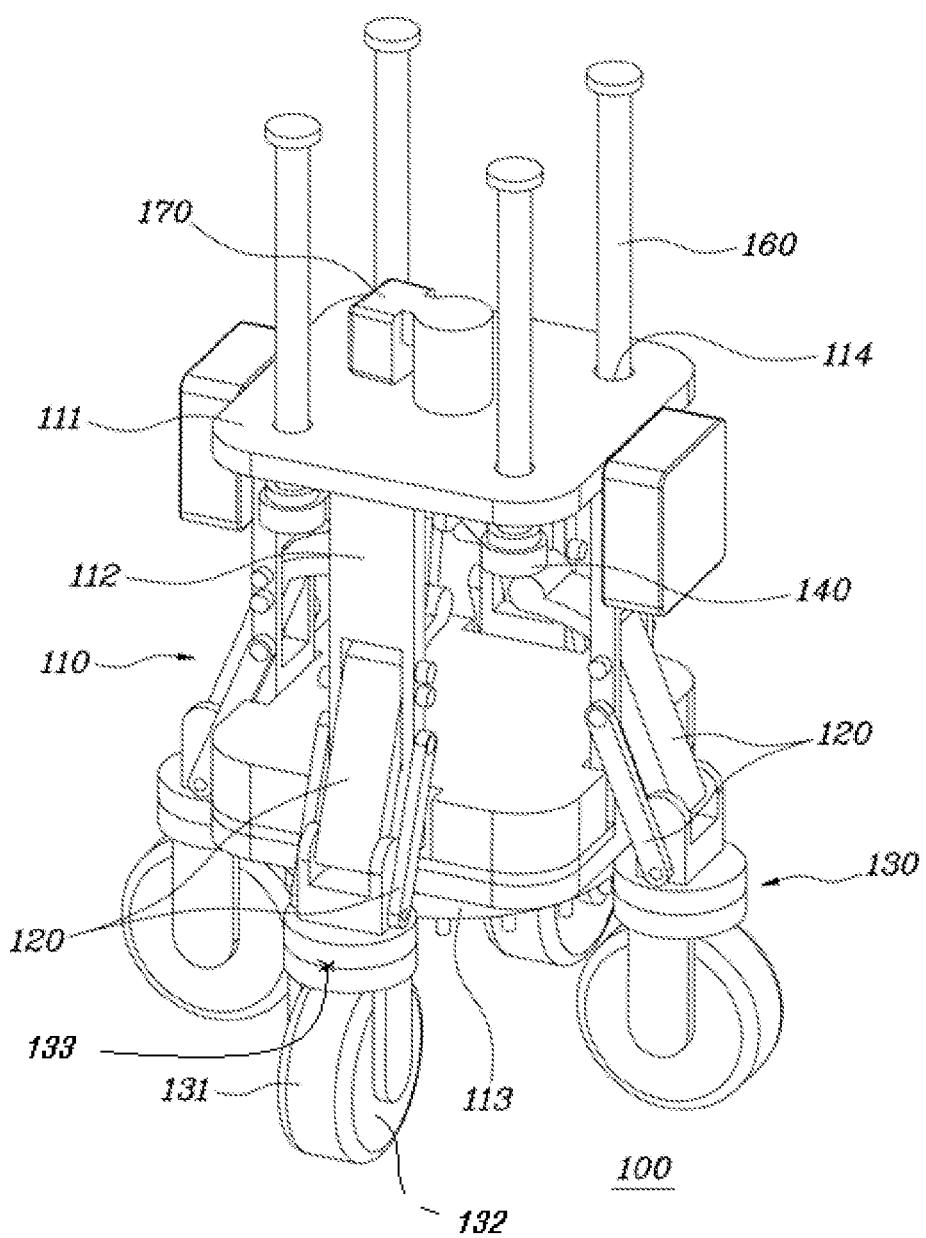
FIG. 1 is a perspective diagram illustrating a height adjustment module according to an embodiment of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of the embodiments of the present disclosure disclosed in the specification or application are only for the purpose of illustrating the embodiments of the present disclosure, and the embodiments in accordance with the present disclosure can be embodied in various forms and should not be construed as limited to the embodiments set forth in the specification or application.

Hereinafter, preferred embodiments of the present disclosure will be described in detail with reference to the accompanying drawings. The same reference numerals in each drawing denote the same members.

Figure 2:
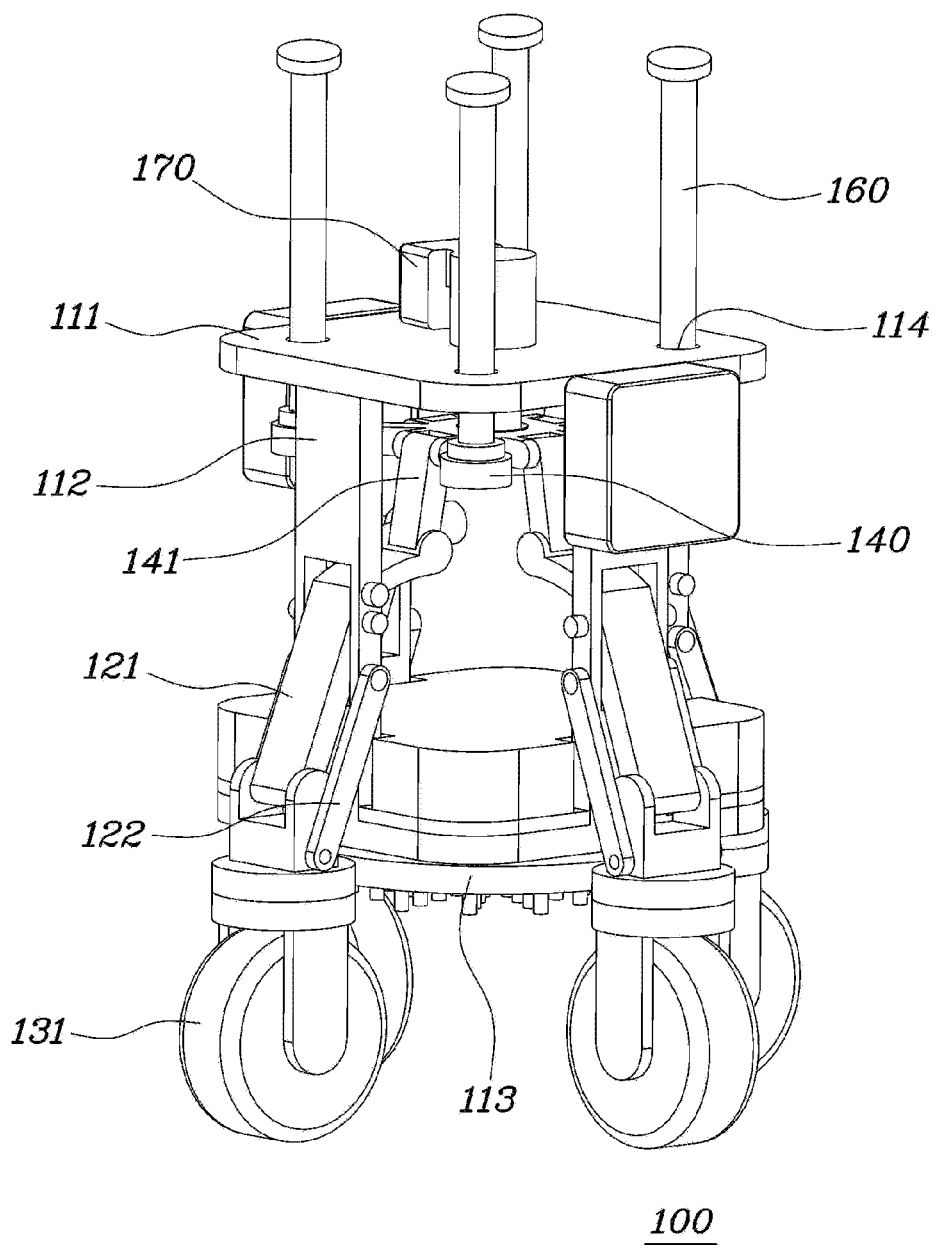
FIGS. 2 and 3 are perspective diagrams illustrating a state where the height of the height adjustment module according to an embodiment of the present disclosure is adjusted.
Figure 3:
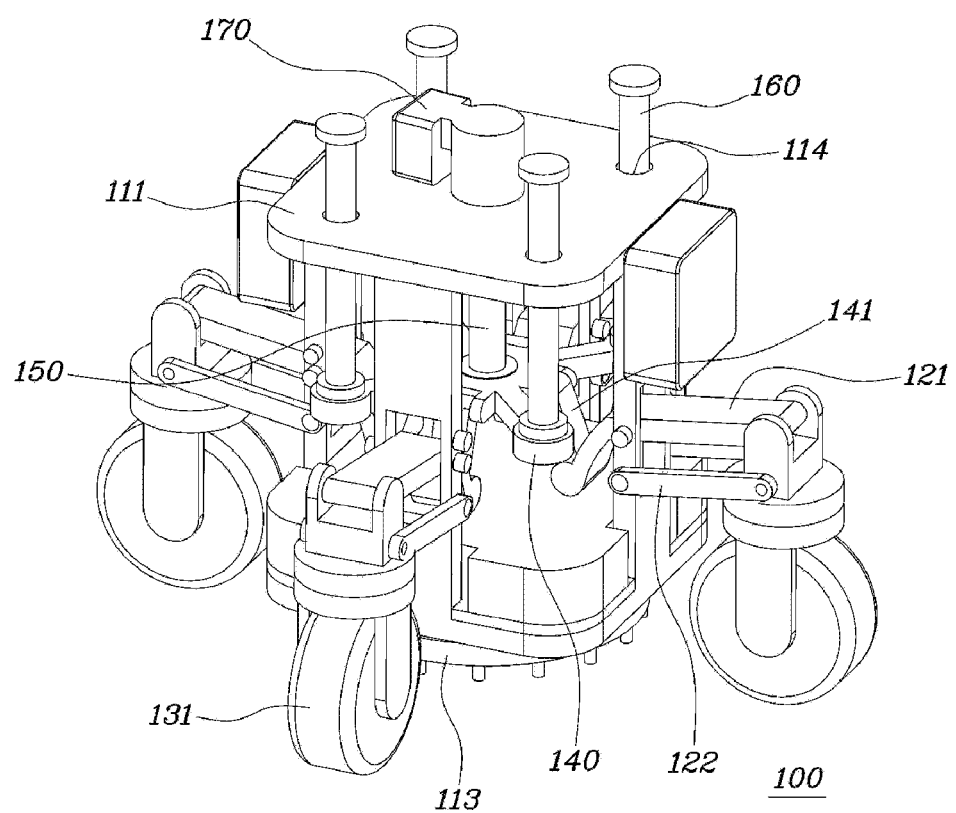
Figure 4:
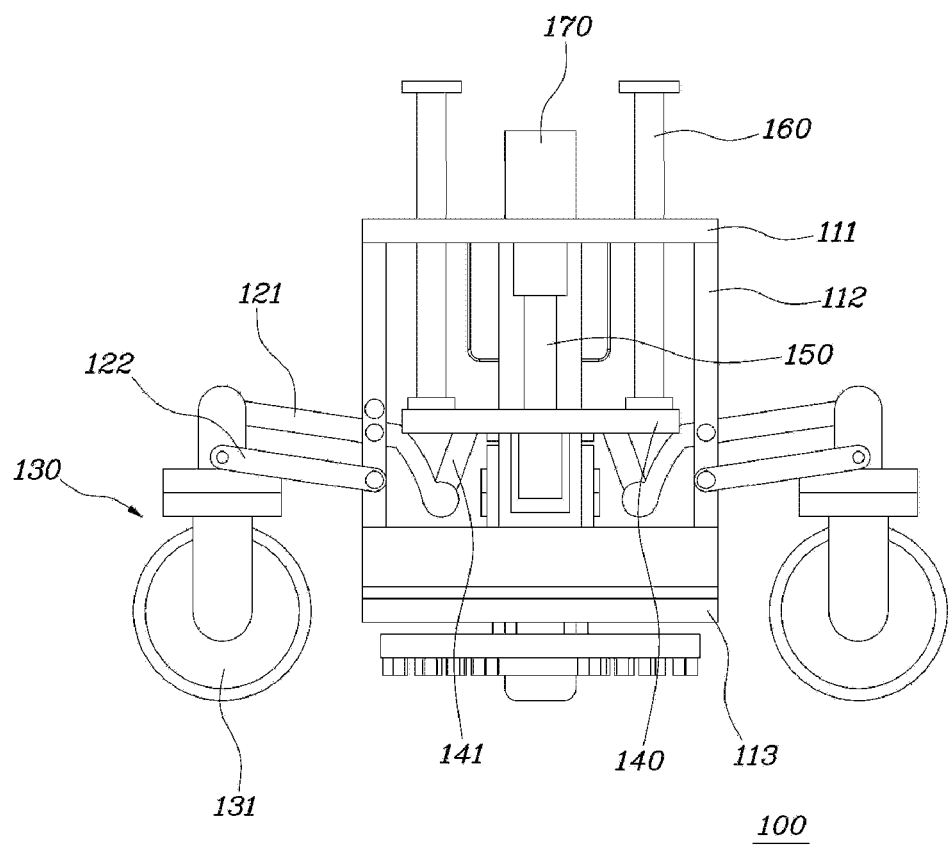
FIGS. 4 and 5 are cross-sectional diagrams illustrating a state where the height of the height adjustment module according to an embodiment of the present disclosure is adjusted.
Figure 5:
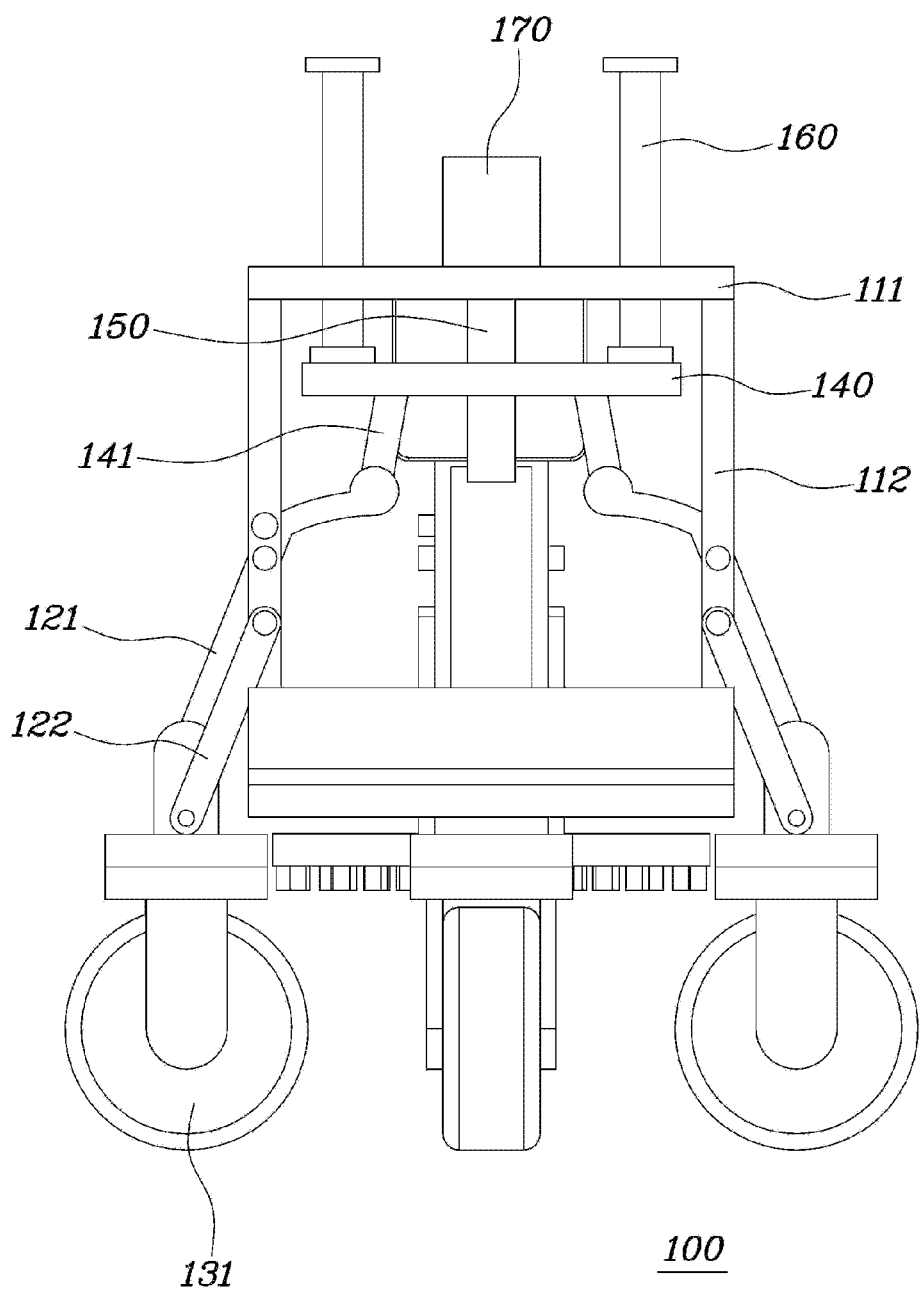

FIG. 1 is a perspective diagram illustrating a height adjustment module 100 according to an embodiment of the present disclosure, FIGS. 2 and 3 are perspective diagrams illustrating a state where the height of the height adjustment module 100 according to an embodiment of the present disclosure is adjusted, and FIGS. 4 and 5 are cross-sectional diagrams illustrating a state where the height of the height adjustment module 100 according to an embodiment of the present disclosure is adjusted.

Referring to FIGS. 1 to 5, a height adjustment module 100 according to an embodiment of the present disclosure includes a mounting part 110 extending on a plane; a plurality of support arms 120 disposed around the mounting part 110 on the plane where the mounting part 110 has been extended, and coupled to the mounting part 110 to be rotatable upward or downward; a plurality of travelling parts 130 each being coupled to a first end portion of the support arm 120, respectively, and including a wheel 131 contacting a ground, respectively; a lift 140 extending over the plane, and connected with second end portions of the plurality of support arms 120 so that vertical movement is interlocked with each other; and a support link 150 coupled to the mounting part 110 to be vertically slidable, and coupled to the lift 140 to be vertically fixed to move the mounting part 110 relative to the lift 140 as the support link 150 is slid in the mounting part 110.

The mounting part 110 can be extended in a direction parallel to the ground. As described later, the mounting part 110 can have a shape extended to have a constant height. The plurality of support arms 120 can be disposed on the mounting part 110 around the mounting part 110 to be coupled to the mounting part 110.

For example, the mounting part 110 can be formed in a polygonal shape such as a triangle or a quadrangle in a direction parallel to the ground, and the support arm 120 can be matched to the corners of the mounting part 110 around the mounting part 110 of the polygonal shape, respectively.

Particularly, the support arm 120 can be disposed symmetrically to the center of the mounting part 110. That is, the mounting part 110 preferably has a shape such as a regular triangle or a square, and the support arm 120 can be disposed to be coupled to the center of each corner to stably support the mounting part 110. As illustrated, the mounting part 110 can have a square shape in a direction parallel to the ground, and the support arm 120 can be formed at the center of each corner. Alternatively, the mounting part 110 can have a circular shape in a direction parallel to the ground.

The plurality of support arms 120 can be coupled to the mounting part 110 to be rotatable upward or downward. Particularly, the support arm 120 can be coupled to the mounting part 110 to be inclined downward from the mounting part 110. However, as the support atm 120 is vertically rotated, the support atm 120 can be parallel to the ground or deformed to be inclined upward from the ground.

The travelling part 130 can be coupled to a first end portion of the support arm 120, respectively, to support the mounting part 110. Particularly, the travelling part 130 extends downward to have the wheel 131 disposed on the first end portion thereof, and the wheel 131 can contact the ground to support the height adjustment module 100 of the present disclosure.

The lift 140 can be extended on the ground in parallel with the mounting part 110, and can vertically move relative to each other in parallel with the mounting part 110. The second end portions of the plurality of support arms 120 are connected to the lift 140, respectively, such that the second end portions of the plurality of support arms 120 can be interlocked with vertical movement of the lift 140. That is, the second end portion of the support atm 120 can be moved together as the lift 140 is vertically moved.

Specifically, the second end portion of the support arm 120 can be directly coupled to the lift 140, or can be indirectly coupled through a separate configuration. Therefore, the second end portion of the support arm 120 is moved by interlocking with the upward or downward movement of the lift 140, and therefore, the support arm 120 can be vertically rotated with respect to the rotary shaft coupled to the mounting part 110.

The support link 150 can move the lift 140 vertically with respect to the mounting part 110. Particularly, the support link 150 is coupled to the lift 140 to be vertically fixed to be simultaneously moved, and coupled to the mounting part 110 to be vertically slidable, such that the lift 140 can be vertically moved simultaneously as the support link 150 is vertically slid and moved in the mounting part 110.

Therefore, the lift 140 is vertically moved simultaneously while the support link 150 is vertically slid with respect to the mounting part 110, and the second end portion of the support arm 120 connected with the lift 140 is also moved vertically. When the second end portion of the support arm 120 is vertically moved, the support arm 120 is rotated with respect to the mounting part 110 coupled to be rotatable upward or downward so that the first end portion of the support atm 120 is moved in the vertical opposite direction, thereby varying the area supported to the ground simultaneously while varying the height of the height adjustment module 100.

Specifically, a distance between the plurality of travelling parts 130 can be reduced when the plurality of support arms 120 are rotated downward with respect to the mounting part 110, and the distance between the plurality of travelling parts 130 can be extended when the plurality of support arms 120 are rotated upward with respect to the mounting part 110.

Therefore, the distance from the ground between the wheels 131 coupled to the first end portion of the support arm 120 to contact the ground can be increased or reduced, thereby varying the area supported to the ground.

That is, according to the present disclosure, as only the support link 150 is slid, the area supported to the ground can be varied together with the height of the height adjustment module 100, thereby securing the stability and simultaneously varying the height of the height adjustment module 100.

More specifically, the mounting part 110 includes an upper plate part 111 and a lower plate part 113 vertically spaced apart from each other, and a connecting part 112 for connecting the upper plate part 111 and the lower plate part 113 to each other, and the lift 140 can be vertically moved between the upper plate part 111 and the lower plate part 113.

The mounting part 110 can be composed of the upper plate part 111 and the lower plate part 113 formed in a shape that is the same as each other or corresponds to each other, and the connecting part 112 that connects them to each other to form the side surface thereof, thereby having a polygonal shape or a cylindrical shape.

The lift 140 can be disposed inside the spacing space between the upper plate part 111 and the lower plate part 113 to be vertically moved, and the support arm 120 can be rotatably coupled to the connecting part 112. Therefore, the lift 140 and the second end portion of the support arm 120 connected thereto can be covered from the outside in order to be vertically moved in the inner space of the mounting part 110.

A through hole 114 vertically penetrated is formed in the upper plate part 111, and a guide link 160 extending upward from the upper plate part 111 while penetrating the through hole 114 is formed in the lift 140, such that a distance between an upper end portion of the guide link 160 and the mounting part 110 can be varied according to the relative movement between the lift 140 and the mounting part 110.

The guide link 160 can be coupled with the lift 140 to be vertically fixed to be vertically moved integrally with the lift 140. Particularly, the guide link 160 can be disposed in plural over the plane parallel with the mounting part 110.

More specifically, the guide link 160 can be disposed in three or more, or disposed in the same number as the number of the support arms 120. That is, the guide link 160 can be symmetrically disposed in a direction parallel to the ground so that an apparatus such as a main body 200 of a robot can be mounted on the upper portion thereof. Particularly, the guide link 160 can be disposed to be offset from the support atm 120 in order not to interfere with the position of the support arm 120.

The guide link 160 is slid in the through hole 114 of the mounting part 110 together with the sliding of the support link 150, thereby preventing the lift 140 from being tilted in a direction parallel to the ground.

In addition, when the main body 200 of the robot is coupled to the upper end portion of the guide link 160, vertical movement of the guide link 160 together with vertical movement of the mounting part 110 occurs in duplicate, thereby amplifying the height variation of the robot.

The support arm 120 includes a first link 121 and a second link 122 vertically spaced apart from each other in parallel, and the first link 121 and the second link 122 can be coupled to the mounting part 110 and the travelling part 130 at a position vertically spaced apart from each other.

The support arm 120 is composed of the first link 121 and the second link 122, and each of the first link 121 and the second link 122 can be coupled to the mounting part 110 and the travelling part 130. Particularly, the first link 121 and the second link 122 are formed in parallel to each other to be vertically spaced apart from each other so that the first link 121 and the second link 122 can be coupled to the mounting part 110 and the travelling part 130 at a position vertically spaced apart from each other.

The first link 121 can have the second end portion extended to the lift 140 side to be coupled to the mounting part 110 between the first end portion thereof and the second end portion thereof, and a connecting link 141 can be coupled with the second end portion of the first link 121 and the lift 140 at both ends thereof to be rotatable upward or downward, respectively, to connect the first link 121 and the lift 140.

Specifically, both first end portions of the first link 121 and the second link 122 can be coupled to the travelling part 130 to be rotatable upward or downward. However, the second link 122 can have the second end portion coupled to the mounting part 110 to be rotatable upward or downward, the first link 121 can be coupled to the mounting part 110 between the first end portion thereof and the second end portion thereof, and the second end portion of the first link 121 can be further extended to the inside of the mounting part 110 than the connecting part 112 of the mounting part 110 to be coupled to the lift 140.

Particularly, the lift 140 and the second end portion of the first link 121 can be connected through the connecting link 141. Both ends of the connecting link 141 can be coupled with the second end portion of the first link 121 and the lift 140 to be rotatable upward or downward, respectively.

Therefore, the connecting link 141 compensates that the second end portion of the first link 121 is vertically moved and simultaneously moved laterally while the first link 121 is rotated vertically with respect to the connecting part 112. Therefore, the first link 121 has the second end portion smoothly moved vertically with respect to the rotary shaft coupled to the connecting part 112 of the mounting part 110.

The height adjustment module according to the present disclosure can further include an actuator 170 prepared in the mounting part 110 to vertically slide the support link 150 in the mounting part 110.

The actuator 170 is a linear actuator, and can be operated to vertically move the support link 150. Particularly, the actuator 170 can be fixed to the upper surface portion of the mounting part 110 to generate a force of pulling the support link 150 upward or pressing the support link 150 downward.

Therefore, by driving one actuator 170, the height adjustment module 100 of the present disclosure secures the stability or varies the height and the width supported to the ground so that the height of the main body 200 mounted thereon can be increased.

Each of the travelling parts 130 can include a driving motor 132 for providing a driving force to rotate the wheel 131. An in-wheel motor can be included as the driving motor 132 in each of the wheels 131 included in each of the travelling parts 130 to supply a driving force for driving the wheel 131. In addition, each of the wheels 131 can be individually driven so that the entire direction of the module can be steered.

The wheel 131 in the travelling part 130 is rotatably coupled to the travelling part 130 with respect to the rotary shaft perpendicular to the ground, and a steering motor 133 for rotating the wheel 131 with respect to the rotary shaft perpendicular to the ground can be included in each of the travelling parts 130.

The travelling part 130 can include the steering motor 133 capable of rotating the wheel 131 in all directions with respect to the rotary shaft perpendicular to the ground. That is, the rotation direction of the wheel 131 included in the travelling part 130 by the clouds in place can be varied by the steering motor 133.

Therefore, the height adjustment module 100 of the present disclosure can steer even in place by an Omni Drive or Swerve Drive method.

Figure 6:
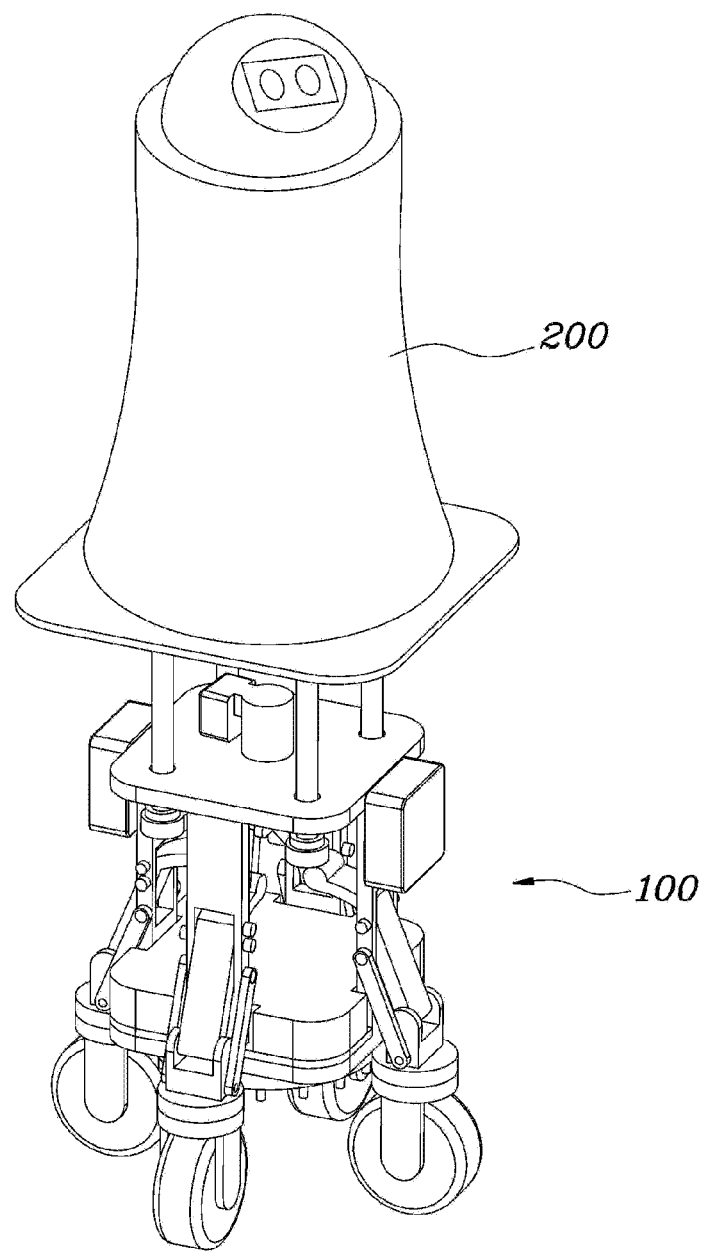
FIG. 6 is a diagram illustrating a robot system including the height adjustment module according to an embodiment of the present disclosure.

FIG. 6 is a diagram illustrating a robot system including the height adjustment module 100 according to an embodiment of the present disclosure.

Further referring to FIG. 6, a robot system including the height adjustment module 100 according to an embodiment of the present disclosure has the main body 200 of the robot coupled to the upper end portion of the guide link 160 at the upper portion of the guide link 160.

That is, when the main body 200 of the robot is coupled to the upper portion of the guide link 160, the vertical movement of the guide link 160 that vertically moves with respect to the mounting part 110 together with the vertical movement of the mounting part 110 itself are implemented, thereby amplifying the vertical movement distance.

In addition, the height adjustment module can further include a control unit (not illustrated) for controlling the actuator 170 to vertically slide the support link 150 in the mounting part 110 based on the required height of the robot.

The control unit according to an exemplary embodiment of the present disclosure can be implemented through a non-volatile memory (not illustrated) configured to store data relating to an algorithm configured to control the operation of various components of the vehicle or a software command for playing the algorithm, and a processor (not illustrated) configured to perform the operation described below by using the data stored in the corresponding memory. Herein, the memory and the processor can be implemented as a separate chip. Alternatively, the memory and the processor can be implemented as a single chip integrated with each other. The processor can take the form of one or more processors.

The control unit (not illustrated) can be mounted on the main body 200 of the robot, or in a space inside the mounting part 110 of the height adjustment module 100. The control unit (not illustrated) can receive the required height of the robot, or can directly determine the required height of the robot according to the situation.

For example, the control unit (not illustrated) can determine that the robot is required to be stable in a situation where the robot should be travelled at a high speed and control the actuator 170 to move the support link 150 downward in order to reduce the height of the robot and increase the ground support width of the robot.

Conversely, when determining that the height of the robot should be increased in a situation where a service should be provided to humans, the control unit (not illustrated) can control the actuator 170 to move the support link 150 upward.

In addition, the control unit can control the driving motor 132 and the steering motor 133 based on the required movement of the robot.

When receiving the movement of the robot or determining to move the robot, the control unit can control the moving direction of the robot by controlling the steering motor 133, and control the travelling speed of the robot by controlling the driving motor 132.

While it has been illustrated and described with respect to the specific embodiments of the present disclosure, it will be understood by those skilled in the art that various improvements and changes of the present disclosure can be made within the technical spirit of the present disclosure as provided by the following claims.

What is claimed is:

1. A height adjustment module, comprising:
   a mounting part extending on a plane;
   a plurality of support arms disposed around the mounting part on the plane on which the mounting part has been extended, and coupled to the mounting part to be rotatable upward or downward;
   a plurality of travelling parts being coupled to a first end portion of one of the support arms, respectively, and comprising a wheel contacting a ground, respectively;
   a lift extending over the plane, and connected with second end portions of the plurality of support arms so that vertical movement is interlocked with each other; and
   a support link coupled to the mounting part to be vertically slidable, and coupled to the lift to be vertically fixed to move the mounting part relative to the lift as the support link is slid in the mounting part, wherein the mounting part comprises an upper plate part and a lower plate part vertically spaced apart from each other, and a connecting part for connecting the upper plate part and the lower plate part to each other, and wherein the lift is vertically moved between the upper plate part and the lower plate part.

2. The height adjustment module according to claim 1, wherein a through hole vertically penetrated is formed in the upper plate part, and a guide link extending upward from the upper plate part while penetrating the through hole is formed in the lift, such that a distance between an upper end portion of the guide link and the mounting part is varied according to the relative movement between the lift and the mounting part.

3. A robot system comprising the height adjustment module of claim 2,
wherein the main body of a robot is coupled to the upper end portion of the guide link.

4. The robot system comprising the height adjustment module according to claim 3, further comprising a control unit for controlling an actuator to vertically slide the support link in the mounting part based on a required height of the robot.

5. The robot system comprising the height adjustment module according to claim 4,
wherein the wheel in the travelling part is rotatably coupled to travelling part with respect to a rotary shaft perpendicular to the ground, and each of the travelling parts comprises a driving motor for providing a driving force to rotate the wheel and a steering motor for rotating the wheel with respect to the rotary shaft perpendicular to the ground, and
wherein the control unit controls the driving motor and the steering motor based on a required movement of the robot.

6. The height adjustment module according to claim 1,
wherein each of the support arms comprises a first link and a second link vertically spaced apart from each other in parallel, and the first link and the second link are coupled to the mounting part and the travelling part at a position vertically spaced apart from each other.

7. The height adjustment module according to claim 6,
wherein the first link has a second end portion extended to the lift side to be coupled to the mounting part between a first end portion of the mounting part and a second end portion of the mounting part, and the connecting link is coupled to the second end portion of the first link and the lift at both ends thereof to be rotatable upward or downward, respectively, to connect the first link and the lift.

8. The height adjustment module according to claim 1, further comprising an actuator provided in the mounting part to vertically slide the support link in the mounting part.

9. The height adjustment module according to claim 1,
wherein each of the travelling parts comprises a driving motor for providing a driving force to rotate the wheel.

10. The height adjustment module according to claim 1,
wherein the wheel in the travelling part is rotatably coupled to the travelling part with respect to a rotary shaft perpendicular to the ground, and each of the travelling parts comprises a steering motor for rotating the wheel with respect to the rotary shaft perpendicular to the ground.

11. The height adjustment module according to claim 1,
wherein a distance between the plurality of travelling parts is reduced when the plurality of support arms are rotated downward with respect to the mounting part, and the distance between the plurality of travelling parts is extended when the plurality of support arms are rotated upward with respect to the mounting part.

\* \* \* \* \*